(12) United States Patent
Kim et al.

(10) Patent No.: US 12,317,073 B2
(45) Date of Patent: May 27, 2025

(54) RELAY COMMUNICATION

(71) Applicant: LG Electronics Inc., Seoul (KR)

(72) Inventors: Dongjoo Kim, Seoul (KR); Sungduck Chun, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 18/015,597

(22) PCT Filed: Jun. 14, 2021

(86) PCT No.: PCT/KR2021/007377
§ 371 (c)(1),
(2) Date: Jan. 11, 2023

(87) PCT Pub. No.: WO2022/014870
PCT Pub. Date: Jan. 20, 2022

(65) Prior Publication Data
US 2023/0254692 A1 Aug. 10, 2023

(30) Foreign Application Priority Data
Jul. 15, 2020 (KR) .................. 10-2020-0087648

(51) Int. Cl.
*H04W 12/06* (2021.01)
*H04W 12/61* (2021.01)
(Continued)

(52) U.S. Cl.
CPC ........... *H04W 12/06* (2013.01); *H04W 12/61* (2021.01); *H04W 76/14* (2018.02); *H04W 88/04* (2013.01)

(58) Field of Classification Search
CPC .. H04L 63/166; H04W 12/043; H04W 12/06; H04W 12/068; H04W 12/069; H04W 12/08; H04W 12/30; H04W 12/50; H04W 12/61; H04W 12/106; H04W 76/14; H04W 76/10; H04W 76/11; H04W 76/01; H04W 88/04; H04W 92/10; H04W 92/18; H04W 4/40; H04W 48/16
See application file for complete search history.

(56) References Cited

U.S. PATENT DOCUMENTS 10,615,844 B2    4/2020  Dao et al.
11,889,391 B2 *  1/2024  Shan ............... H04W 12/08
(Continued)

FOREIGN PATENT DOCUMENTS

CN     106162803    11/2016
KR     101406058    6/2014
(Continued)

*Primary Examiner* — Le H Luu
(74) *Attorney, Agent, or Firm* — Fish & Richardson P.C.

(57) ABSTRACT

A disclosure of the present specification provides a method for performing relay communication by a first UE. The method may comprise the steps of: transmitting a request message including UE ID, relay information, UE type information, and UE public key information to an application server through a 5G core network; receiving, from the application server, a security-related message in response to the request message; establishing a security link with the relay UE on the basis of first credential information; and receiving an IP message for configuring a security channel in an IP layer from a second UE.

15 Claims, 12 Drawing Sheets

(51) Int. Cl.
*H04W 76/14* (2018.01)
*H04W 88/04* (2009.01)

(56) References Cited

U.S. PATENT DOCUMENTS

| | | | |
|---|---|---|---|
| 12,004,111 B2* | 6/2024 | Shan | H04W 4/40 |
| 2009/0265543 A1* | 10/2009 | Khetawat | H04W 76/12 |
| | | | 713/151 |
| 2019/0342851 A1* | 11/2019 | Shan | H04W 76/11 |
| 2020/0100088 A1* | 3/2020 | Kim | H04W 48/16 |
| 2020/0305118 A1* | 9/2020 | Ryu | H04W 76/10 |
| 2020/0344605 A1* | 10/2020 | Lee | H04W 12/106 |
| 2020/0359440 A1* | 11/2020 | Qiao | H04W 76/11 |

FOREIGN PATENT DOCUMENTS

| | | |
|---|---|---|
| KR | 20160087768 | 7/2016 |
| KR | 101915373 | 11/2018 |

\* cited by examiner

RELAY COMMUNICATION

CROSS-REFERENCE TO RELATED APPLICATIONS

This application is a National Stage application under 35 U.S.C. § 371 of International Application No. PCT/KR2021/007377, filed on Jun. 14, 2021, which claims the benefit of Korean Patent Application No. 10-2020-0087648, filed on Jul. 15, 2020. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for 5G (fifth generation) new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC). ultra-reliable and low latency communications (URLLC), etc. The NR shall be inherently forward compatible.

In 5G mobile communication, User Equipment (UE)-to-UE Relay (UE-to-UE Relay) has been introduced. UE-to-UE relay may refer to a method in which an end terminal (e.g., a first UE) communicates with another end terminal (e.g., a second UE) through a relay terminal. The relay terminal may relay all signals exchanged between the first UE and the second UE.

Meanwhile, the relay terminal receives both a signal transmitted from the first UE to the second UE and a signal transmitted from the second UE to the first UE. Accordingly, a security problem may occur, such as the relay terminal eavesdropping on or changing a signal transmitted from the first UE to the second UE or a signal transmitted from the second UE to the first UE. Conventionally, a method for solving such a security problem in UE-to-UE relay communication has not been discussed.

SUMMARY

Accordingly, a disclosure of the present specification has been made in an effort to solve the aforementioned problem.

In order to solve the above problem, one disclosure of the present specification provides a method for a first UE to perform relay communication. The method may include: transmitting a request message including UE ID, Relay information, UE type information, and UE public key information to an application server through a 5G core network; receiving a security related message from the application server as a response to the request message; establishing a secure link with the relay UE based on first credential information, and receiving an IP message for establishing a secure channel in an IP layer from the second UE.

In order to solve the above problem, one disclosure of the present specification provides a first UE performing relay communication. The first UE includes at least one processor; and at least one memory that stores instructions and is operatively electrically connectable with the at least one processor, wherein operations performed based on execution of the instructions by the at least one processor may include: transmitting a request message including UE ID, Relay information. UE type information, and UE public key information to an application server through a 5G core network; receiving a security related message from the application server as a response to the request message; establishing a secure link with the relay UE based on first credential information; and receiving an IP message for establishing a secure channel in an IP layer from the second UE.

In order to solve the above problems, one disclosure of the present specification provides a device in mobile communication. The device includes at least one processor; and at least one memory that stores instructions and is operatively electrically connectable with the at least one processor, wherein operations performed based on execution of the instructions by the at least one processor may include: generating a request message including device ID, Relay information, device type information, and device public key information; identifying a security related message from the application server as a response to the request message; establishing a secure link with the relay device based on first credential information; and identifying an IP message for establishing a secure channel in an IP layer from the other device.

In order to solve the above problems, one disclosure of the present specification provides a non-transitory computer readable storage medium recording instructions. The instructions, when executed by one or more processors, cause the one or more processors to: generating a request message including device ID, Relay information, device type information, and device public key information; identifying a security related message from the application server as a response to the request message; establishing a secure link with the relay device based on first credential information; and identifying an IP message for establishing a secure channel in an IP layer from the other device.

In order to solve the above problem, one disclosure of the present specification provides a method for an application server to perform communication. The method may include: receiving a request message including UE ID, Relay information, UE type information, and UE public key information from the UE through a 5G core network; authenticating whether the UE has authority to operate as an end UE or a relay UE in a UE-to-UE relay service, based on the UE type information and the UE ID; and transmitting a security related message as a response to the request message, based on completion of the authentication.

In order to solve the above problem, one disclosure of the present specification provides a method for a first UE to perform relay communication. The method may include transmitting a request message including UE ID, Relay information. UE type information, and UE public key information to an application server through a 5G core network; receiving a security related message from the application server as a response to the request message; establishing a secure link with the relay UE based on first credential information; and transmitting an IP message for establishing a secure channel in the IP layer to a second UE.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
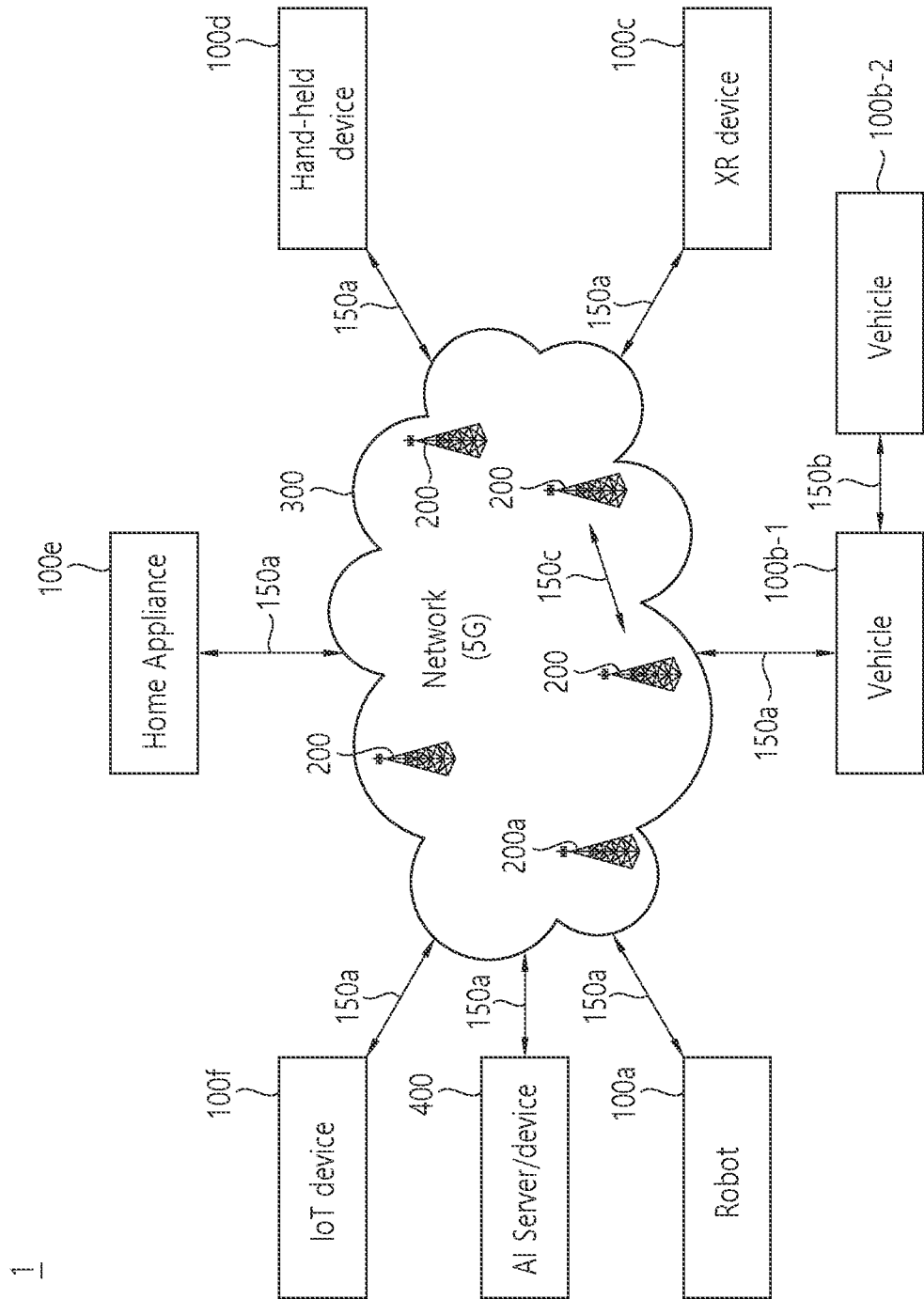
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (i.e., EE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure. "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without users control or with minimal users control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
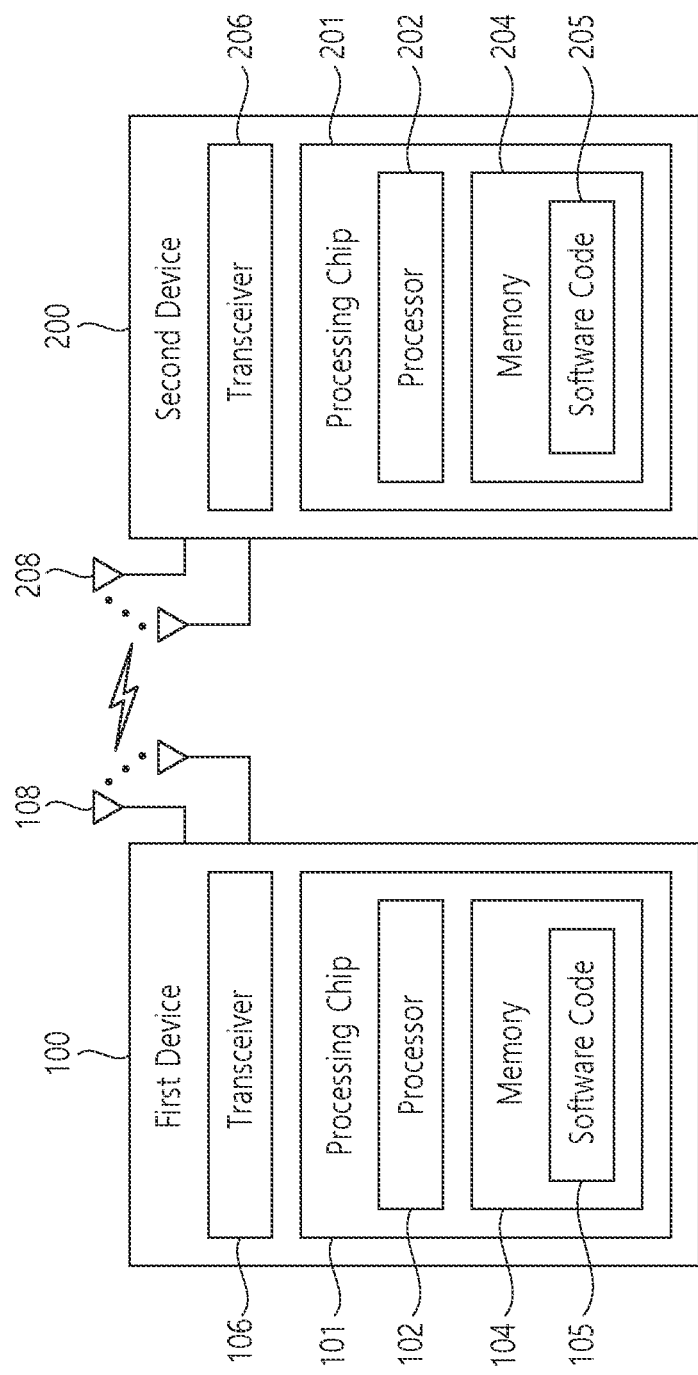
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
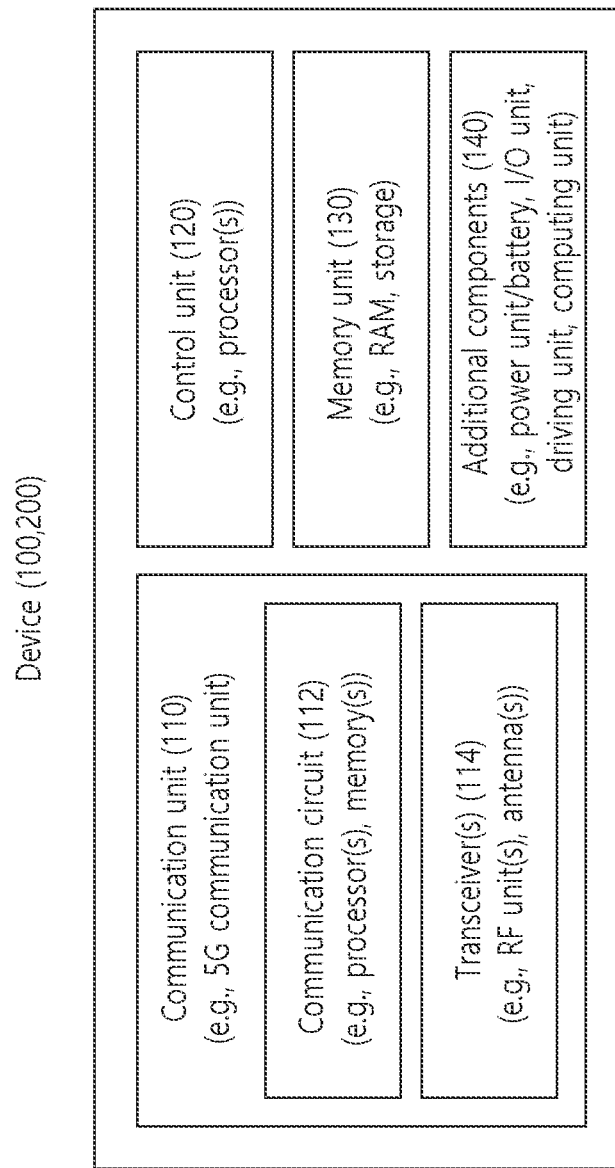
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
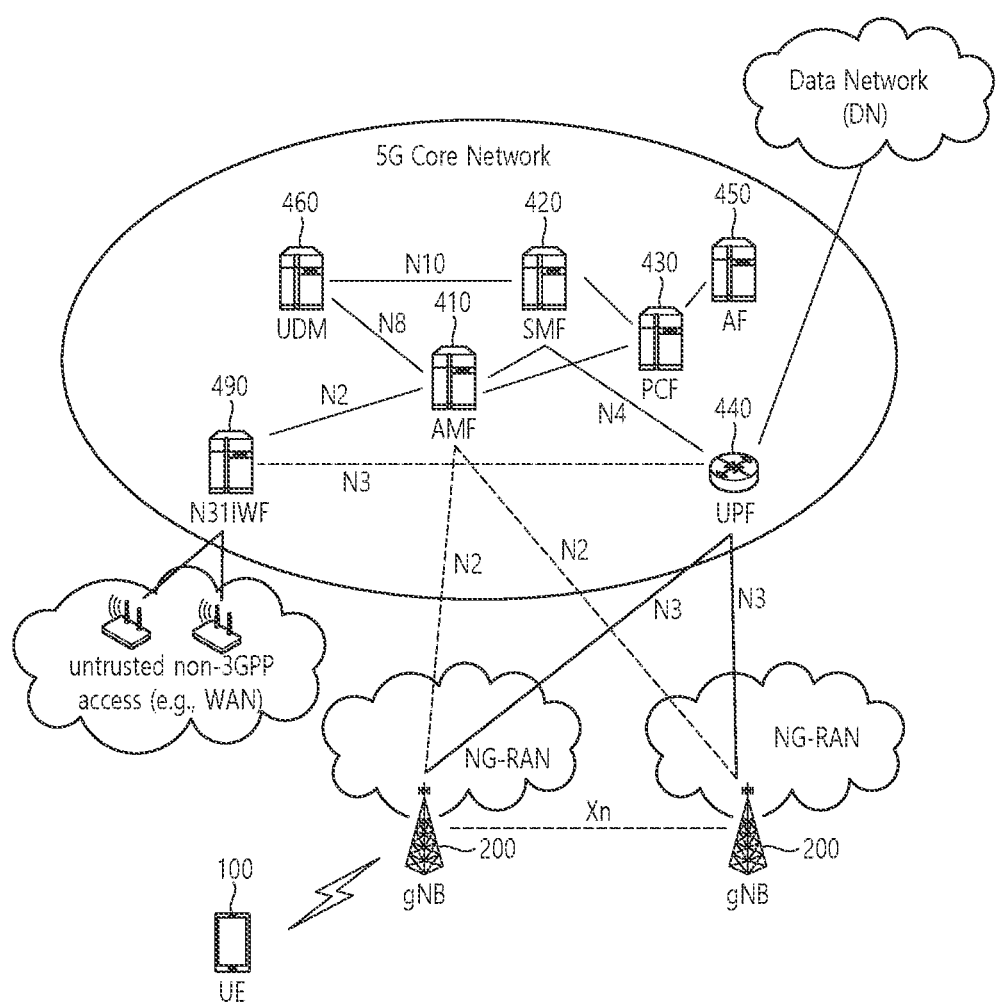
FIG. 4 is a structural diagram of a next-generation mobile communication network.

FIG. 4 is a structural diagram of a next-generation mobile communication network.

5GC (5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP (3rd Generation Partnership Project) inter-working function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is anode that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The $5^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

<D2D (Device to Device) Communication>

On the other hand, D2D communication will be described below.

Figure 5:
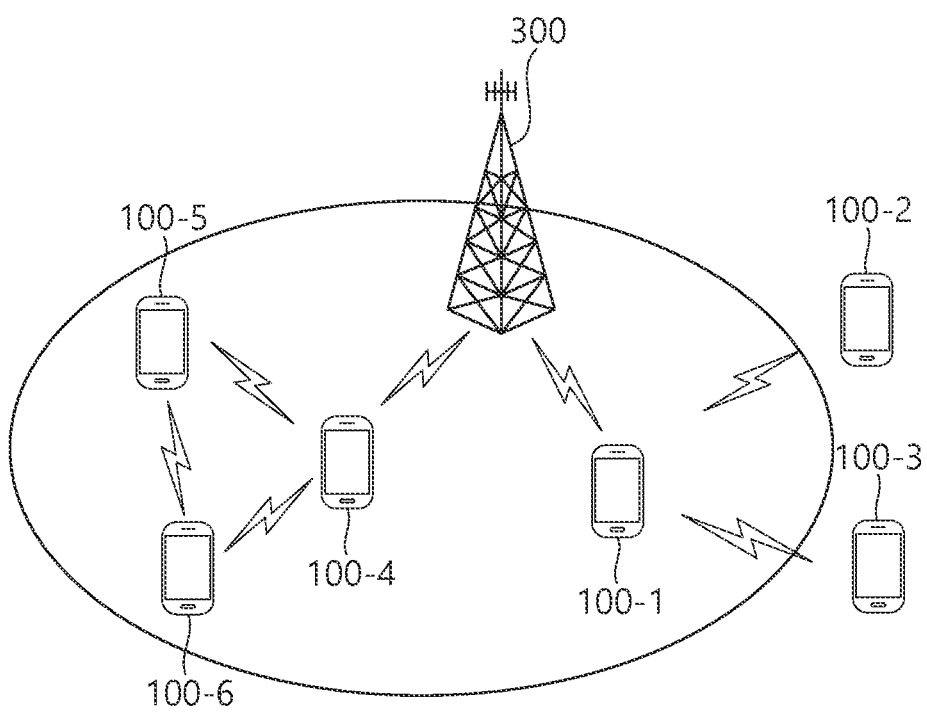
FIG. 5 shows the concept of D2D (Device to Device) communication.

FIG. 5 shows the concept of D2D (Device to Device) communication.

Due to an increase in user requirements for a social network service (SNS), communication between UEs at a physically close distance, that is, device to device (D2D) communication, is required. In addition, in the case of UEs used for public safety (Public Safety), D2D (Device to Device) communication may be used.

Figure 6:
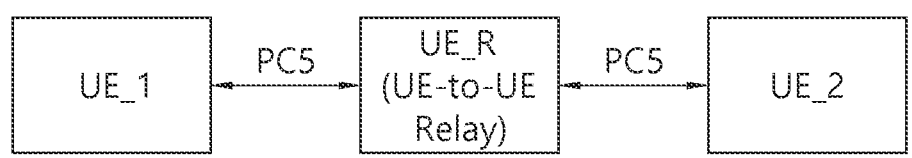
FIG. 6 shows an example of a UE-to-Network Relay (UE-to-Network Relay).

In order to reflect the above requirements, as shown in FIG. 6, a method for directly communicating between UE #1(100-1), UE #2(100-2), UE #3(100-3) or UE #4(100-4), UE #5(100-5), UE #6(100-6), without the intervention of the base station (eNodeB) 200 is being discussed. Of course, it is possible to communicate directly between the UE #1 100-1 and the UE #4 100-4 with the help of the base station (gNB) 300. Meanwhile, UE #4 (100-4) may serve as a relay for UE #5 (100-5) and UE #6 (100-6). Similarly. UE #1100-1 may serve as a repeater for UE #2 100-2 and UE #3100-3 that are far away from the cell center.

On the other hand, D2D communication is also called a proximity service (Proximity Service: ProSe). In addition, a UE performing a proximity service is also referred to as a ProSe UE. A link between UEs used for the D2D communication is also called a sidelink.

The physical channels used for the sidelink include the following.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in the sidelink.

Demodulation Reference signal: DMRS
Sidelink Synchronization signal: SLSS

The SLSS includes a primary sidelink synchronization signal (PSLSS) and a secondary sidelink synchronization signal (Secondary SLSS: SSLSS).

FIG. 6 shows an example of a UE-to-Network Relay (UE-to-Network Relay).

Referring to FIG. 6, a UE-to-UE relay may support communication between UEs (UE_1 and UE_2).

A PC5 link may be an interface between a UE and a UE-to-UE relay.

The UE-to-UE Relay may relay traffic between UE_1 and UE_2. The UE-to-UE Relay may provide a general function that can relay all IP traffic between UE_1 and UE_2.

Communication between UE_1 or UE_2 and the UE-to-UE relay may be performed as one-to-one direct communication.

II. Disclosure of the Present Specification

Using the ProSe system, it is possible for two terminals that do not reach the transmission distance to communicate directly through a relay terminal (e.g. Relay UE, UE-to-UE Relay) without going through the 5G core network.

Figure 7:
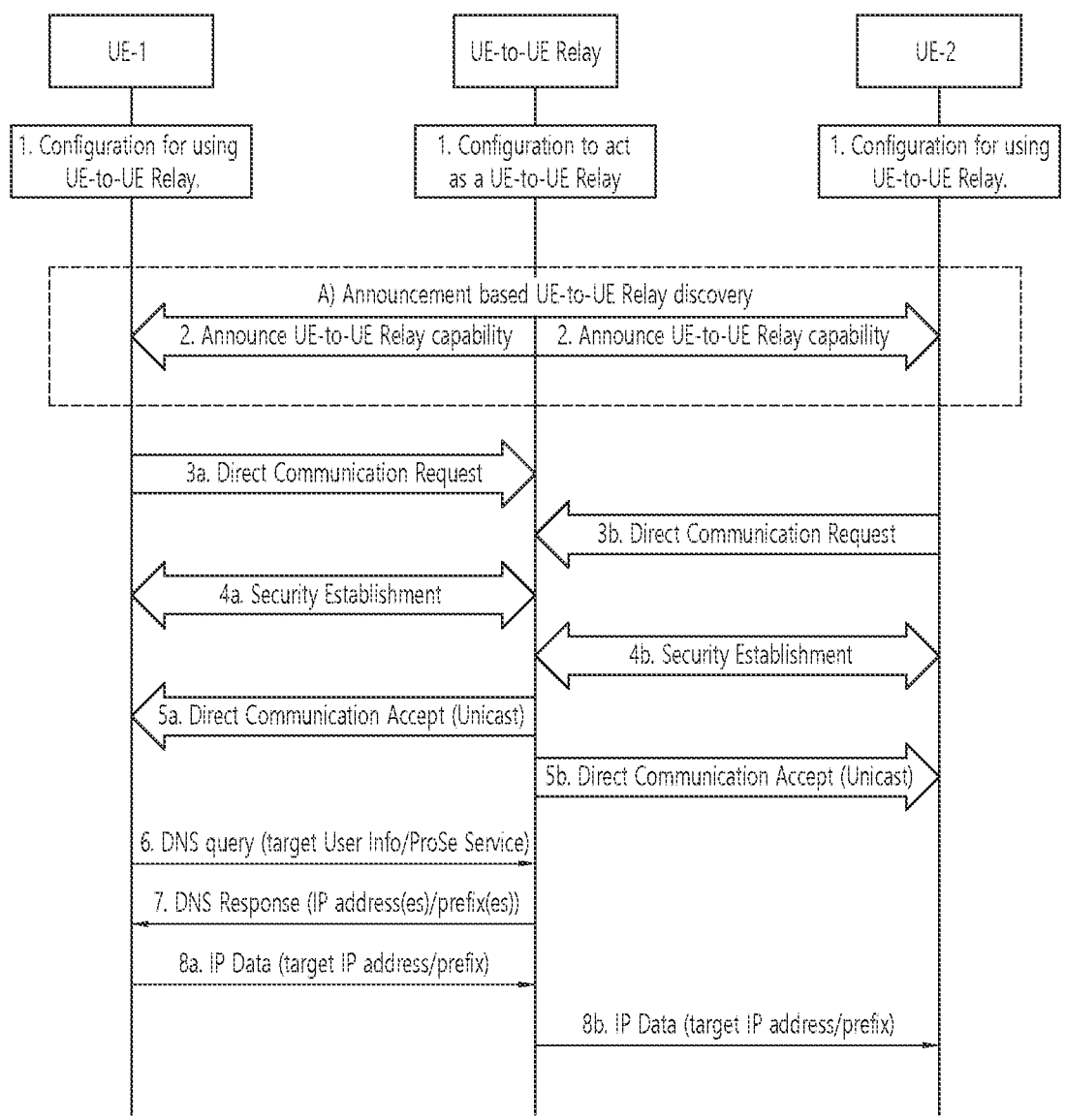
FIG. 7 shows an example of a UE-to-UE relay operation.

The following example of FIG. 7 shows an example of UE-to-UE relay communication.

FIG. 7 shows an example of a UE-to-UE relay operation.

Referring to FIG. 7, UE-1, UE-to-UE Relay, and UE-2 are shown.

1) UE-1 and UE-2 may be configured to use UE-to-UE Relay. UE-to-UE Relay may be configured to operate as a UE-to-UE Relay.

2) The UE-to-UE Relay may announce capability information (e.g., UE-to-UE Relay Capability) that it can operate as a UE-to-UE Relay. In other words, the UE-to-UE Relay may inform UE-1 and UE-2 of capability information (e.g., UE-to-UE Relay Capability) that it can operate as a UE-to-UE Relay. However, step 2) is only an example, and UE-1 and UE-2 may discover the UE-to-UE Relay in a conventional method other than the announcement method.

3a) UE-1 may directly transmit a communication request message to the UE-to-UE Relay. In order for UE-1 to communicate with UE-2, UE-1 needs to communicate through the UE-to-UE Relay, UE-1 may first transmit a direct communication request message to perform direct communication with the UE-to-UE Relay.

3b) Similar to step 3a), UE-2 may directly transmit a communication request message to the UE-to-UE Relay. In order for UE-2 to communicate with UE-1, since UE-2 must communicate via the UE-to-UE Relay, UE-2 may first transmit a direct communication request message to perform direct communication with the UE-to-UE Relay.

4a) UE-to-UE Relay and UE-1 may perform a procedure for establishing a secure link.

4b) UE-to-UE Relay and UE-2 may perform a procedure for establishing a secure link.

5a) The UE-to-UE Relay may transmit a direct communication accept message to UE-1 indicating that it accepts direct communication with UE-1 (e.g., direct communication using unicast method).

5b) The UE-to-UE Relay may transmit a direct communication accept message to UE-2 indicating that it accepts direct communication with UE-2 (e.g., direct communication using unicast method).

6) UE-1 may transmit a Domain Name System (DNS) query message to the UE-to-UE Relay in order to communicate with UE-2. The DNS query message may include target user information and ProSe service related information. Here, the target user information may be information related to UE-2 that UE-1 wants to communicate with.

7) UE-to-UE Relay may transmit a DNS response message to UE-1. The DNS response message may include IP address(es)/prefix(es) information. IP address(es)/prefix(es) information may be used by UE-1 to transmit IP data to UE-2.

8a) UE-1 may transmit IP data (including target IP address/prefix) to be transmitted to UE-2 to UE-to-UE Relay.

8b) UE-to-UE Relay may transmit IP data (including target IP address/prefix) to UE-2.

For reference, the procedure described in the example of FIG. 7 describes one example of enabling direct communication between these two terminals. On the other hand, conventional solutions such as the example of FIG. 7 have several problems in terms of security.

For reference, in the disclosure of the present specification, relay terminal, relay UE, relay UE, UE-to-UE relay, and UE-to-UE relay may all be used as terms having the same meaning. In addition, an end terminal, an end UE, an end terminal, and an end UE may all be used as terms having the same meaning.

According to the prior art, when terminals perform one-to-one communication through the PC5 interface, 5G communication provides security functions such as authentication integrity check, and data encryption between two terminals. That is, security is guaranteed in the communication link between the transmitting terminal and the relay terminal, and also between the relay terminal and the receiving terminal However, if the prior art is applied to the relay system as it is, a new security threat may occur. Specifically, the relay terminal receives an encrypted message from the transmitting terminal. Then, the relay terminal may decrypt the received message, encrypt the decrypted message, and transmit the message again through a secure channel with the receiving terminal. At this time, the moment the relay terminal decrypts the message, the original message remains in the relay terminal (i.e., the relay terminal can store the decrypted message), such information can be subject to security threats such as malicious eavesdropping and alteration. In other words, if the relay terminal decodes the message transmitted by the sending terminal, security threats such as eavesdropping or alteration of information used for communication between a transmitting terminal and a receiving terminal may occur.

This problem may be solved by additionally applying the Internet Protocol Security (IPSec) protocol, which is widely used in the existing Internet, above the Internet Protocol (IP) layer of terminals, after setting the security of two relayed links (e.g., a communication link between a transmitting terminal and a relay terminal, and a communication link between a receiving terminal and a relay terminal).

The following drawings are made to explain a specific example of the present specification. Since the names of specific devices or names of specific signals/messages/fields described in the drawings are provided as examples, the technical features of the present specification are not limited to the specific names used in the drawings below.

Figure 8:
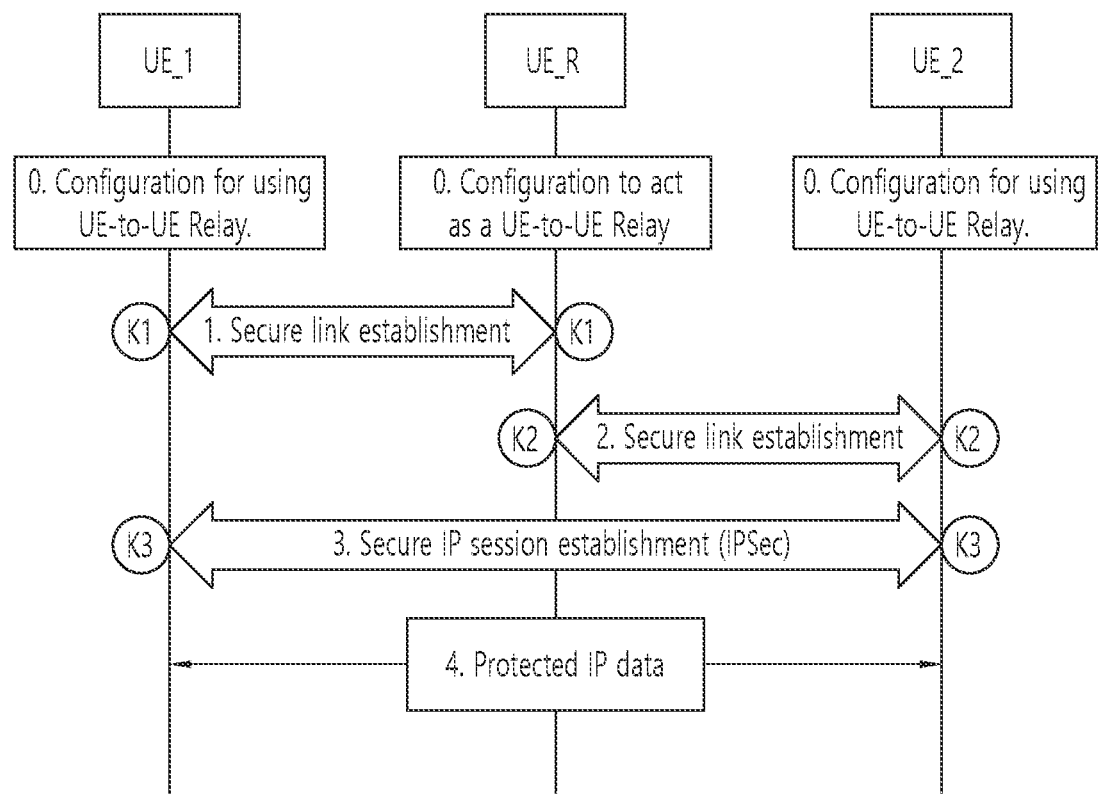
FIG. 8 shows an example of a security setting procedure in direct communication between devices.

FIG. 8 shows an example of a security setting procedure in direct communication between devices.

FIG. 8 shows an example briefly illustrating an example of a channel setting (or establishment) process considering security setting, when direct communication between terminals is performed through a relay terminal, That is, the example of FIG. 8 shows an example of an end-to-end security setting process in direct communication between terminals through a relay terminal.

Referring to FIG. 8, UE_1, UE_R (Relay UE), and UE_2 are shown. UE_1 may also be referred to as a transmitting terminal, UE_R as a relay terminal, and UE_2 as a receiving terminal.

0) A transmitting terminal (UE_1), a relay terminal (UE_R), and a receiving terminal (UE_2) may each receive parameters for establishing a secure communication channel between terminals from the ProSe Application Server through the 5G Core network. Here, the ProSe application server may mean an application server related to ProSe communication.

1) UE_1 and UE_R may perform a process of establishing a secure channel between UE_1 and UE_R (e.g., a process of establishing a secure channel based on the 3GPP PC5 PDCP layer). UE_1 and UE_R may generate a first secret key ("K1" in the example of FIG. 8) used to generate an encryption key for secure communication between the two terminals.

2) UE_2 and UE_R may perform a process of establishing a secure channel between UE_2 and UE_R (e.g., a process of establishing a secure channel based on the 3GPP PC5 PDCP layer). UE_2 and UE_R may generate a second secret key ("K2" in the example of FIG. 8) used to generate an encryption key for secure communication between the two terminals.

3) UE_1 and UE_2 may perform a process (e.g. process of establishing a secure channel based on the IPSec protocol at the IP layer) of establishing a secure channel between UE_1 and UE_2. UE_1 and UE_2 may generate a third secret key ("K3" in the example of FIG. 8) used to generate an encryption key for secure communication between the two terminals.

4) UE_1 encrypts the IP data transmitted to UE_2 twice and transmits a message including the IP data to UE_R. For example, the data transmitted by UE_1 is encrypted once by an encryption key derived from the third secret key, and it may be secondarily encrypted in the 3GPP PC5 PDCP layer with an encryption key derived from the first secret key and delivered to UE_R. UE_R, having received the encrypted IP data from UE_1, may decrypt the received message with an encryption key derived from the first secret key (e.g., an encryption key derived in the same manner as UE_1 derived the encryption key). Then, UE_R may encrypt the decrypted message with an encryption key derived from the second secret key and deliver the encrypted message to UE_2. UE_2 may first decrypt the received message with the second secret key. UE_2 forwards the decrypted message to the IP layer of UE_2, the IP layer of UE_2 once again decrypts (decrypts) the message decrypted with the third secret key, the IP layer of UE_2 may obtain the original message transmitted by UE_1 (including IP data transmitted by UE_1).

Here, "encryption" may mean a general expression including all procedures (or functions) required for security, such as encryption, integrity, and scrambling. In other words, the term "encryption" in the disclosure of this specification may mean that a procedure (or function) required for security is applied. Separate keys used for each security function (e.g., encryption, integrity, scrambling, etc.) may all be derived from a single secret key negotiated between two communicating terminals.

Based on the procedure described in the example of FIG. 8, UE_R without the third secret key cannot decrypt the encrypted message between UE_1 and UE_2, security threats (e.g., security threats in communication between UE_1 and UE_2) can be reduced.

On the other hand, when the IPSec protocol is applied to the 3GPP ProSe system as it is, problems such as the following examples of security requirements not being met may occur. In other words, in order to apply the IPSec protocol to the 3GPP ProSe system, the following additional security requirements must be considered:

The IPSec protocol is basically a protocol used under the premise that both ends know what type of security to apply. Therefore, when the IPSec protocol is applied to the ProSe UE-to-UE relay system, a method for notifying both terminals (e.g., UE_1 and UE_2 in the example of FIG. 8) of information on which type of security is applied is required. That is, the transmitting terminals and receiving terminals (e.g., UE_1 and/or UE_2 in the example of FIG. 8) should be able to determine whether or not end-to-end security (IPSec protocol) is applied and the type of security function to be applied based on the security level required for each service. For example, transmitting terminals and receiving terminals (e.g., UE_1 and/or UE_2 in the example of FIG. 8) must know in advance whether a service used in communication is a service required by end-to-end security. Through this, if the sending terminal of the corresponding service sends a message without end-to-end security applied, the receiving terminal must be able to reject this or request the creation of an end-to-end secure channel again.

When the IPSec protocol between end-to-end devices is initially established, Man-In-The-Middle (MITM) attacks bust be prevented. For example, it should be possible to prevent a relay terminal from threatening security (e.g. security in communication between receiving and sending terminals) by disguising itself as a receiving terminal or a transmitting terminal.

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of this specification may be composed of a combination of one or more operations/configurations/steps described below. The following methods described below may be performed or used in combination or complementary.

5G wireless communication supports Proximity-based Service (ProSe) communication in which terminals directly search for and communicate with each other. Each terminal can perform direct communication with other terminals that do not reach a communication distance by utilizing a relay function among the functions of ProSe communication. For example, the disclosure of this specification describes a method for enabling direct communication between devices more safely in the ProSe service.

First, an example in which the ProSe application server delivers necessary information to the terminal will be described. For example, authorization and provisioning between the ProSe application server and the terminal will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 9:
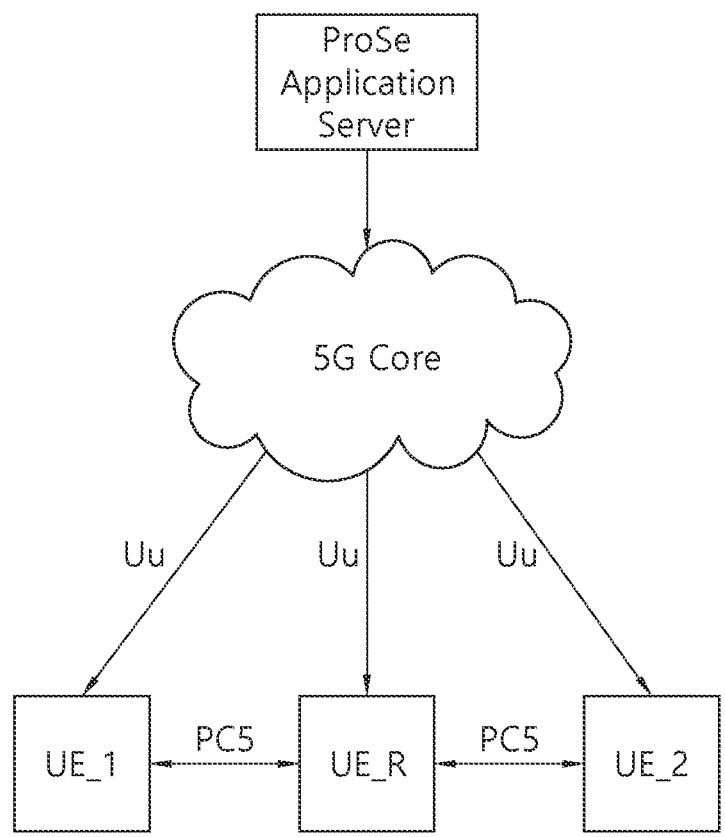
FIG. 9 shows an example of a structure in which a ProSe application server communicates with terminals.

FIG. 9 shows an example of a structure in which a ProSe application server communicates with terminals.

In the 5G system, the ProSe service provider can deliver necessary information to the terminal through the PCF according to the policy.

For example, in UE-to-UE relay communication through a relay terminal, as shown in the example of FIG. 9, the ProSe Application Server delivers security setting information to the 5G core network, the PCF of the 5G core network may deliver security setting information to the terminal through the Uu interface. In other words, the security setting information delivered from the ProSe Application Server is delivered to the terminal through the 5G Core (PCF) Uu interface, the transferred information can be used for PC5 communication between terminals.

Hereinafter, examples of information necessary for the contents described in the disclosure of this specification will be described.

Specifically, each terminal may request security setting information including the following information from the ProSe Application Server in step 0) of FIG. 8. For example, each terminal (e.g., UE_1, UE_R, UE_2) transmits a request message including information as in the example below to the ProSe Application Server in step 0 of FIG. 8, each terminal (e.g., UE_1, UE_R, UE_2) may request security setting information from ProSe Application Server. Here, each terminal may transmit a request message to the ProSe application server through the 5G core network. For example, the terminal may transmit a request message to the PCF, and the PCF may forward the request message to the ProSe application server. For reference, the request message transmitted by each terminal may be transmitted at the time when the terminal is first registered, alternatively, the request message may be transmitted in a separate procedure (e.g., a procedure newly defined to perform an operation according to the disclosure of the present specification or a procedure used in the prior art) performed after the terminal is registered. Examples of information transmitted by each terminal are as follows:

UE Identity: ID that distinguishes UE in ProSe Application Server

Relay indication: Indicates that the UE-to-UE relay function is used (different from UE-to-Network relay)

UE type: transmitted to distinguish whether the terminal sending the request message is a relay terminal or an end terminal UE public key (Optional); Transmitted to the ProSe Application Server for qualification verification only for the end terminal Upon receiving the request message (e.g., the request message transmitted by the UE) through the mobile communication network (e.g., the 5G core network), the ProSe application server, may perform authorization verification for the UE based on the UE Identity included in the request message. After the ProSe application server performs authorization verification, if the UE requests UE-to-UE Relay, the ProSe application server may deliver information such as the following example to the terminal according to the UE type.

i) If the UE type of the device is a relay device:

Credential: A root credential that can be used for secure link establishment between devices (symmetric key, asymmetric key, certificate, etc. can be selected depending on application selection). The ProSe application server may deliver credential information to the Relay terminal. For reference, Credential may mean credential information in security. For reference, when the terminal is a relay terminal, the ProSe application server may provide the relay terminal with separate credentials for each of end terminals capable of communicating with the relay terminal. For example, if there is a possibility that the relay terminal performs secure link establishment with end terminal 1, end terminal 2, and end terminal 3, the ProSe application server may provide Credential 1, Credential 2, and Credential 3 to the relay terminal.

ii) If the UE type of the terminal is not a relay terminal (i.e., if the UE type of the terminal is an end terminal (e.g., end device)):

ii-1) Credential: root credential (symmetric key, asymmetric key, certificate, etc. can be selected depending on application selection) that can be used for secure link establishment between devices. The ProSe application server may deliver credential information to the end terminal.

ii-2) End to End (E2E) security profile: Indicates information on whether end-to-end security setting is required and, if end-to-end security setting is required, indicates information on which security function is required. The ProSe application server may deliver E2E security profile information to the end terminal. For example, the ProSe application server may set the E2E security profile information as follows:

0: disable (i.e., if the E2E security profile information value includes 0, it means that end-to-end security setting is not required)

1: integrity only (i.e., if the E2E security profile information value includes 1, it means that end-to-end security configuration is required and integrity function is required)

2: integrity+authentication (authentication) (that is, if the E2E security profile information value includes 1, it means that end-to-end security settings are required, and integrity and authentication functions are required)

3: integrity+authentication+encryption (encryption) (that is, if the E2E security profile information value includes 1, it means that end-to-end security settings are required, and integrity function, authentication function and encryption function are required)

4: etc.

ii-3) E2E credential: The root credential (e.g., symmetric key, asymmetric key, certificate, etc. can be selected depending on the application selection) to be used when setting up an end-to-end secure channel (e.g., performing mutual verification). For example, the ProSe application server may deliver E2E credential information to the end terminal.

ii-4) E2E credential expiration time (Optional): The time the provided E2E credential is valid. For example, the ProSe application server may selectively deliver E2E credential expiration time information to the end terminal.

ii-5) Application server's public key (Optional): If the E2E credential is a certificate, it is used to verify the certificate received from the terminal. For example, when the ProSe application server delivers the certificate to the end terminal as E2E credential, the ProSe application server may deliver the application server's public key information to the end device.

For reference, in the example described above, the symmetric key may be a credential of a method in which only a terminal having the same key is determined as an authorized terminal. The asymmetric key may be a credential of a method in which only a terminal having a mutually verifiable key pair is determined as an authorized terminal. The certificate may be a credential of a method in which a terminal having a certificate signed with the private key of the ProSe Application Server is determined as an authorized terminal.

Hereinafter, security settings between UEs will be described. For example, UE to UE E2E security setup is described.

E2E security can be selectively used for each service requirement. Therefore, only when UE_1 and UE_2 know information about E2E security in advance, UE_1 and UE_2 can perform security setting related operations. UE_1 and UE_2 may know information about E2E security in advance, through the previously described E2E security profile. The ProSe Application Server may configure the E2E security profile according to the requirements of the UE-to-UE Relay service to be provided to UEs. The ProSe Application Server may provide the E2E security profile to each of UE_1 and UE_2 at the time of registration (e.g., when UE_1 and UE_2 perform the registration procedure).

The UE may determine whether the E2E security profile and the security application level of the message received from the other UE are the same, and determine whether to accept or reject the message of the other UE. For example, the E2E security profile received by UE_2 from the ProSe application server (e.g., the E2E security profile of a service through a relay terminal) and the security application level of the request message received from UE_1 may be different. In this case, UE_2 may reject the request message of UE_1 and transmit a rejection reason to UE_1. Thereafter, UE_1 may attempt to reconnect to UE_2 by applying a security function conforming to the E2E security profile.

Hereinafter, with reference to FIG. 10, an example of security setting between terminals will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 10:
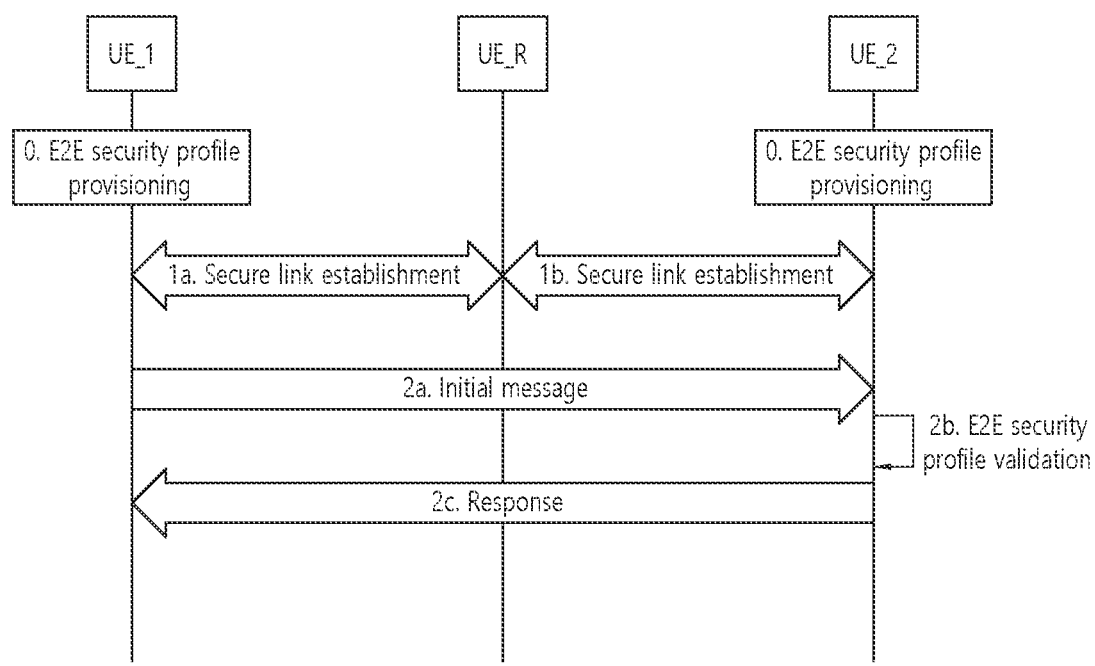
FIG. 10 shows a first example of security settings between terminals according to the disclosure of the present specification.

FIG. 10 shows a first example of security settings between terminals according to the disclosure of the present specification.

0) The transmitting terminal (UE_1) and the receiving terminal (UE_2) may each receive a parameter (E2E security profile) for setting an end-to-end (E2E) secure communication channel from the ProSe Application Server through the 5G Core network.

1a) UE_1 and UE_R may establish a secure channel between UE_1 and UE_R.

1b) UE_2 and UE_R may establish a secure channel between UE_2 and UE_R.

2a) The IP layer of UE_1 may transmit an IPSec protocol initial message or a general IP message to UE_2.

2b) UE_2 may determine whether the received message matches the E2E security profile provided in step 0). For example, UE_2 may determine whether the security application level of the message transmitted by UE_1 matches the E2E security profile received in step 0). Unless the E2E security profile is disabled, the received message must be a message that initiates the IPSec protocol. If the received message is a message that initiates the IPSec protocol, the type of security function to be applied according to the received message must match the E2E security profile provided in step 0). For example, if the E2E security profile provided in step 0) includes all information that integrity, authentication, and encryption are all applied, if only integrity is applied to the IPSec message requested from UE_1, UE_2 may determine that it does not meet the security requirements.

2c) UE_2 may transmit a response message to UE_1. For example, in step 2b), if UE_2 determines that the security requirements are met, UE_2 may proceed with the IPSec protocol setup and complete the E2E security setup. In this case, UE_2 may transmit a setup complete message to UE_1. For another example, in step 2b), if UE_2 determines that the security requirements are not met, UE_2 may transmit a failure message to UE_1 along with a failure reason. UE_1 and UE_2 may retry IP security channel establishment. For example, IP security configuration may fail due to a change or error due to a difference in the E2E security profile between the two end UEs (UE_1 and UE_2). In this case, UE_1 and/or UE_2 requests the ProSe Application Server to update the E2E security profile for the corresponding service, UE_1 and/or UE_2 may retry IP security channel establishment based on the updated E2E security profile. In the example described above, "change" means, for example, a case in which the policy is changed later and information indicating that integrity protection is enabled is provided to UE_2, when the ProSe application server provided information that integrity protection is disabled to UE_1 for the same service. In the above-described example, "error" may mean a case in which the ProSe application server provides different policies to UE_1 and UE_2 due to an error in the server for the same service. For reference, different applications operating in the two end terminals (UE_1 and UE_2) may share one security channel configured with the IPSec protocol. Or, for different Applications operating in the two end terminals (UE_1 and UE_2), the two end terminals (UE_1 and UE_2) may establish separate security channels and utilize separate security channels for different applications.

Hereinafter, authentication based on ProSe application server will be described.

In the example with reference to FIG. 9, an example of information provided by end terminals UE_1 and UE_2 other than the relay terminal UE_R from the ProSe application server has been described. Hereinafter, an example of a method for preventing and/or defending against a Man-In-The-Middle Attack, based on the information provided by the end terminals UE_1 and UE_2 from the ProSe application server, will be described.

Hereinafter, an example of security setting between terminals will be described with reference to FIG. 11.

The following drawings are made to explain a specific example of the present specification. Since the names of specific devices or names of specific signals/messages/fields described in the drawings are provided as examples, the technical features of the present specification are not limited to the specific names used in the drawings below.

Figure 11:
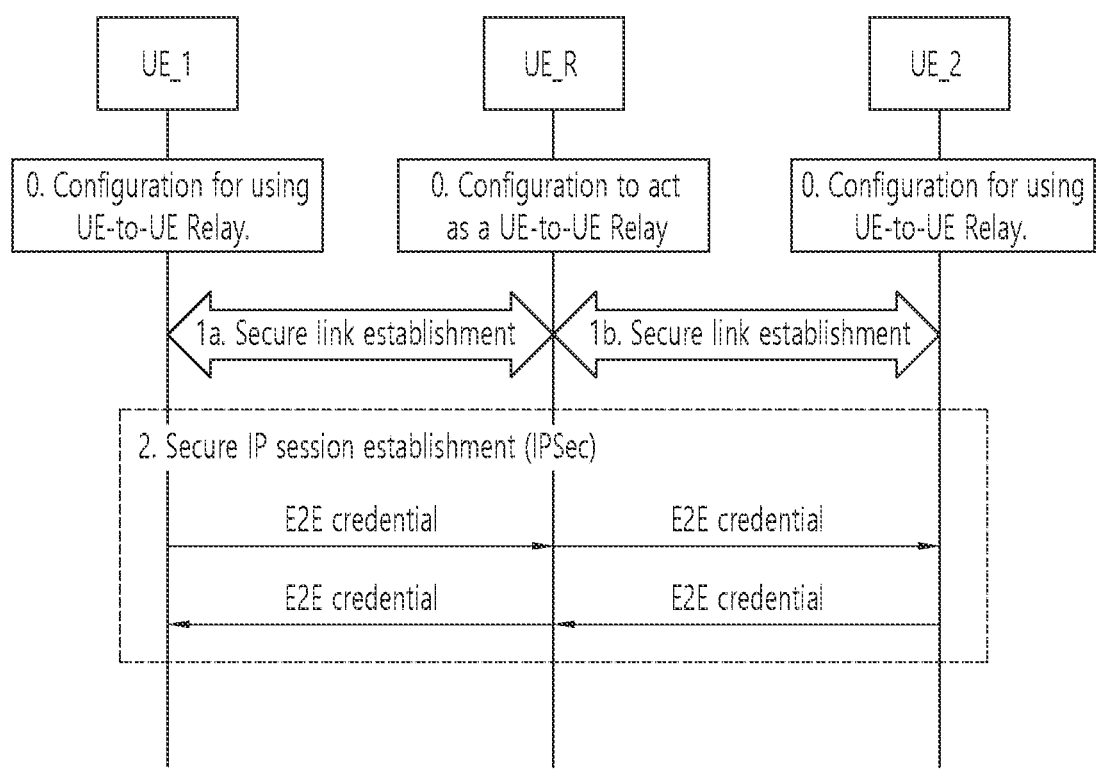
FIG. 11 shows a second example of security settings between terminals according to the disclosure of the present specification.

FIG. 11 shows a second example of security settings between terminals according to the disclosure of the present specification.

0) As described above with reference to the example of FIG. 9, the relay terminal (UE_R) and the end terminals (UE_1 and UE_2) may each receive information necessary for security from the ProSe Application Server.

1) In the same manner as in the prior art, UE_1 and UE_R may establish a secure channel between UE_1 and UE_R UE_2 and UE_R may establish a secure channel between UE_2 and UE_R.

2) If E2E security settings are required according to UE-to-UE Relay service requirements, UE_1 may deliver the E2E Security credential provided in step 0) to UE_2 through UE_R. The E2E security credential may be selectively used as needed among symmetric key (only a terminal having the same key is determined as an authorized terminal), asymmetric key (only a terminal having a mutually verifiable key pair is determined as an authorized terminal) and certificates (a terminal having a certificate signed with the private key of the ProSe Application Server is determined as an authorized terminal). For E2E Security credentials, if a certificate method is used, to be able to verify the signature of the ProSe Application Server. UE_1 may also need to be provided with the public key of the ProSe Application Server in step 0).

For reference, if a method in which E2E credentials are remotely provided to UE_1 and UE_2 from the ProSe Application Server is used, while the information is transmitted from the ProSe Application Server to UE_1 and UE_2, there may be a threat of eavesdropping on this information. Accordingly, a technique for preventing the eavesdropping threat may be applied. For example, when ProSe Application Server provides E2E credential information to UE_1 and UE_2, E2E credential information may be provided by setting an expiration time. And, whenever the valid time expires, the ProSe Application Server may periodically update E2E credential information and may provide the E2E credential information to UE_1 and UE_2.

Since the relay terminal (UE_R) does not have E2E credentials, a man-in-the-middle attack through UE_R is impossible for communication between UE_1 and UE_2. If the terminating UE (UE_1 and/or UE_2) receives a request or response related to the IPSec protocol setup step from a terminal (e.g., an attacker terminal) that does not have valid E2E credentials at a specific moment, each end UE can predict that there is a man-in-the-middle attack. If the terminating UE predicts that there is a man-in-the-middle attack, the terminating UE may include the attacker terminal in the black list and report information about the attacker terminal to the 5G communication network.

Hereinafter, with reference to FIG. 12, an operation combining at least one or more of the examples of FIGS. 9, 10, and/or 11 will be described in detail.

The following drawings are made to explain a specific example of the present specification. Since the names of specific devices or names of specific signals/messages/fields described in the drawings are provided as examples, the technical features of the present specification are not limited to the specific names used in the drawings below.

Figure 12:
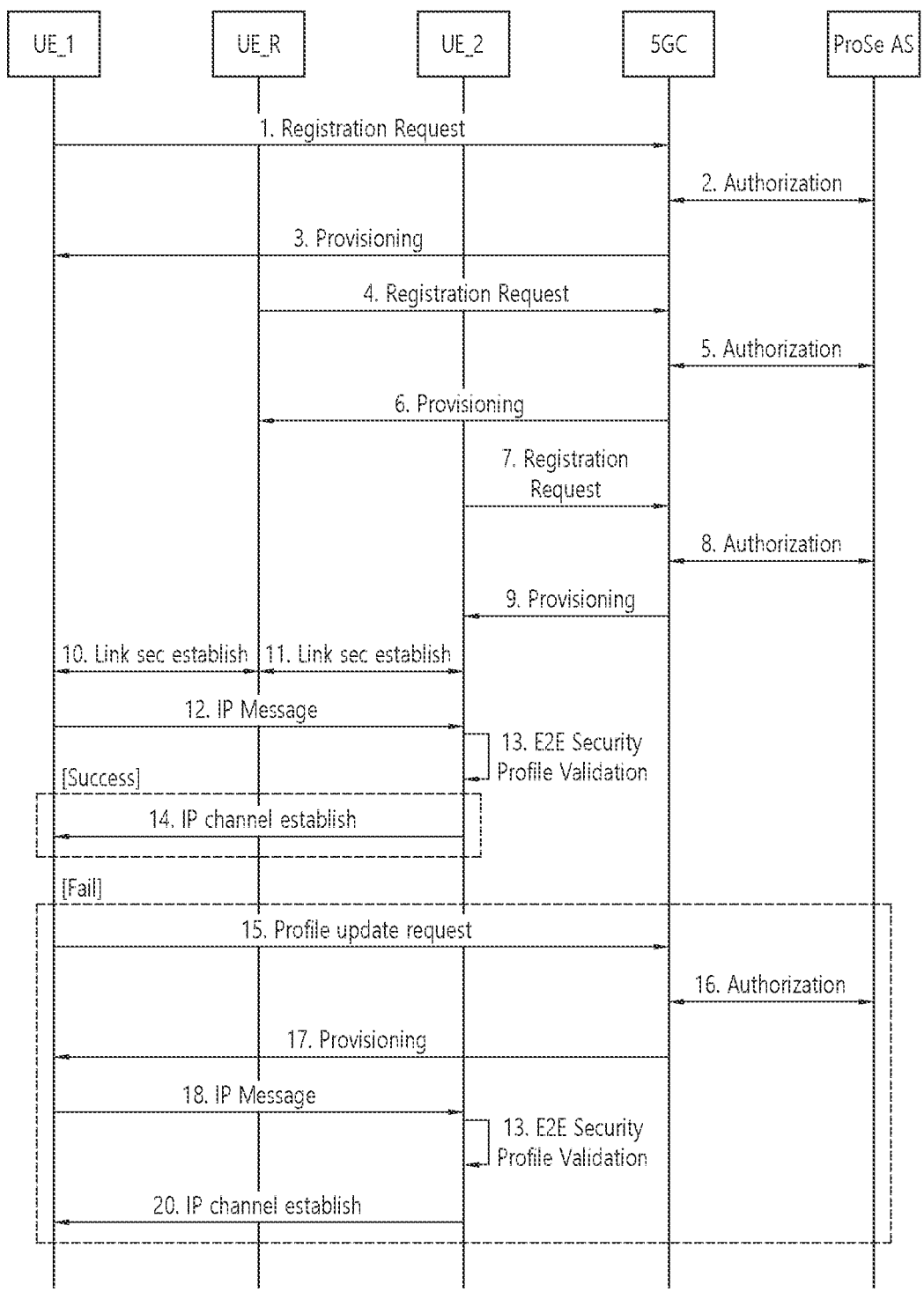
FIG. 12 shows a third example of security settings between terminals according to the disclosure of the present specification.

FIG. 12 shows a third example of security settings between terminals according to the disclosure of the present specification.

1) UE_1 (End source UE) may transmit a registration request message to 5GC. For example, UE_1 (End source UE) may transmit a registration request message including UE ID, Relay indication (UE-to-UE Relay), UE type (End UE) and/or UE Public key (Optional) to 5G Core.

2) 5GC may authenticate whether UE_1 has authority to operate as an end UE in the UE-to-UE Relay service based on the UE ID through the Application Server (ProSe Application Server) that provides the ProSe service. For example, 5GC sends a message including the ID of UE_1 to the ProSe application server, the ProSe application server may request authentication of whether UE_1 has authority to operate as an end UE in the UE-to-UE Relay service.

3) In step 2), if UE_1 is authorized to operate as an End UE, 5GC may provide UE_1 with information related to secure channel setup (e.g., L2 (Layer 2) secure channel setup between UE_1 and Relay UE). Here, 5GC may receive information related to secure channel establishment from the Application Server. For example, information related to establishing a secure channel may include Credential to be used when UE_1 establishes L2 (Layer 2) secure channel with Relay UE, E2E Credential to be used when establishing an end-to-end IP secure channel (e.g., establishing an IP secure channel between UE_1 and UE_2), E2E security profile indicating the level of E2E security to be applied to the service, E2E credential expiration time indicating the E2E credential expiration time and/or public key of the Application server required when E2E credential is a certificate type, etc.

4) UE_R (Relay UE) may transmit a registration request message to 5GC. For example, UE_R (Relay UE) may transmit a registration request message including UE ID, Relay indication (UE-to-UE Relay), UE type (Relay UE), and/or UE Public key (Optional) to 5G Core.

5) Through Application Server (ProSe Application Server) that provides ProSe service. 5GC may authenticate based on UE ID whether UE_R has authority to operate as a Relay UE in UE-to-UE Relay service. For example, 5GC sends a message including the ID of UE_R to the ProSe application server, 5GC may request the ProSe application server to authenticate whether UE_R has authority to act as a relay UE in the UE-to-UE Relay service.

6) In step 5), if UE_R is authorized to operate as a Relay UE, 5GC may provide information related to secure channel establishment (Example: L2 (Layer 2) secure channel setup between UE_R and terminating UEs (UE_1 and UE_2)) to UE_R Here, 5GC may receive information related to secure channel establishment from the Application Server. For example, information related to secure channel establishment may include credentials to be used by the relay UE when establishing an L2 secure channel with terminating UEs.

7) UE_2 (End target UE) may transmit a registration request message to 5GC. For example, UE_2 (End target UE) may transmit a registration request message including UE ID, Relay indication (UE-to-UE Relay), UE type (End UE) and/or UE Public key (Optional) to 5G Core.

5) 5GC can authenticate whether UE_2 has authority to operate as an end UE in the UE-to-UE Relay service based on the UE ID through the Application Server (ProSe Application Server) that provides the ProSe service. For example, 5GC sends a message including the ID of UE_2 to the ProSe application server, the ProSe application server may request authentication of whether UE_2 has authority to operate as an end UE in the UE-to-UE Relay service.

9) In step 8), if UE_2 is authorized to operate as an End UE, 5GC may provide UE_2 with information related to secure channel setup (e.g., L2 (Layer 2) secure channel setup between UE_2 and Relay UE). Here, 5GC may receive information related to secure channel establishment from the Application Server. For example, information related to establishing a secure channel may include Credential to be used when UE_2 establishes L2 (Layer 2) secure channel with Relay UE, E2E Credential to be used when establishing an end-to-end IP secure channel (e.g., establishing an IP secure channel between UE_1 and UE_2), E2E security profile indicating the level of E2E security to be applied to the service, E2E credential expiration time indicating the E2E credential expiration time and/or public key of the Application server required when E2E credential is a certificate type, etc.

10) UE_1 and Relay UE may perform L2 security link establishment between UE_1 and Relay UE based on the credentials received from 5GC in steps 1) and 4), respectively.

11) UE_2 and Relay UE may perform L2 security link establishment between UE_2 and Relay UE based on the credentials received from 5GC in steps 7) and 4), respectively.

12) UE_1 may transmit an IP message to UE_2 via UE_R based on the E2E security profile information received in step 3). For example, based on the E2E Security profile information received in step 3), UE_1 may set UE_2 as a destination and transmit an IP message to which security is not applied or an IPSec protocol start message for applying E2E security to UE_R. Then, UE_R may forward the message received from UE_1 to UE_2. At this time, if E2E security is applied, UE_1 may use the E2E credential transmitted in step 3). UE_R, which cannot have the corresponding E2E credential, cannot interpret the message in the process of transmitting the message of UE_1 to UE_2. Thus, man-in-the-middle attacks (MITM) can be prevented in advance.

13) Based on the E2E Security profile delivered in step 9), UE_2 may determine whether the received IP message meets security requirements of a corresponding service (ProSe service that UE_2 intends to use). If E2E security is not required, UE_2 may directly receive an IP message to which security is not applied. However, if E2E security is required, UE_2 may determine whether the IPSec protocol start message transmitted by UE_1 matches, based on the E2E security profile. For example, the E2E Security profile received by UE 2 is a profile that requires both integrity and encryption. If the received IPSec protocol start message contains information that only integrity applies, UE_2 cannot establish an IPSec channel. According to the result of UE_2 determining whether the received IP message meets the security requirements of the corresponding service (the ProSe service that UE_2 intends to use), if the verification passes, step 14) may be performed. If verification fails, steps 15) to 20) may be performed.

14) In step 13), if the E2E security profile verification of UE_2 passes, according to the IPSec protocol, the UE may complete the establishment of an IP security channel with UE_1 using the E2E credentials received in step 9).

15) In step 13), if UE_2's E2E security profile verification fails, UE_1 and/or UE_2 may request an E2E security profile update to the ProSe Application Server through 5GC. For example, UE_1 and/or UE_2 may transmit a message requesting an E2E security profile update to the ProSe application server through 5GC.

16) 5GC and Application Server may perform authentication for validity of UE_1 and UE_2 based on UE_ID.

17) If the authentication in step 16) passes, the Application Server may provide the updated E2E security profile to 5GC. Then. 5GC may provide the updated E2E security profile to UE_1.

18) UE_1 may retransmit an IPSec protocol start message to UE_2 through UE_R based on the updated E2E security profile.
19) UE_2 can verify the IPSec protocol start message based on the updated E2E security profile.
20) UE_1 and UE_2 may complete IP security channel setup based on E2E credentials according to the requirements of the updated E2E security profile.

According to the description with reference to various examples in the disclosure of this specification, a network (e.g., ProSe application server, 5G core network) may perform operations such as the following examples. A network (e.g., ProSe application server, 5G core network) may distinguish between a relay terminal and an end terminal. A network (e.g., ProSe application server, 5G core network) may provide information about whether end-to-end security needs to be applied and information about the type of security function to the end-terminal. If the network (e.g. ProSe Application Server, 5G Core Network) needs end-to-end security, the network may provide a first credential to the relay terminal through the Uu interface. If the network (e.g. ProSe Application Server, 5G Core Network) needs end-to-end security, the network may provide a first credential and a second credential (End to End Credential) to the end terminal through the Uu interface.

According to the description with reference to various examples in the disclosure of this specification, the first end terminal (e.g., a terminal requesting secure channel establishment) may perform an operation as in the following example. The first end terminal may receive the first credential through the Uu interface. The first end terminal may receive the second credential (End to End Credential) through the Uu interface. The first end terminal may establish a primary secure channel (PC5 unicast link) with the relay terminal using the first credential. The first end device may establish a secondary security channel (IPSec) with the second end device using the second credential. The first end terminal may re-issue the credential through the Uu interface after the expiration time of the terminating credential. A plurality of applications operating in two end-end devices (e.g., a first end-end device and a second end-end device) share the same secondary security channel (IPSec), or may use a separate secondary security channel (IPSec) for each application. If a terminal that does not have valid credentials intervenes in communication when establishing an IP security channel, the end terminal can recognize this and report it to the mobile communication network.

According to the description with reference to various examples in the disclosure of this specification, the second end terminal (e.g., a terminal receiving a message requesting secure channel establishment from the first end terminal) may perform an operation as in the following example. The second end terminal may receive the first credential through the Uu interface. The second end terminal may receive the second credential (End to End Credential) through the Uu interface. The second end terminal may establish a primary secure channel (PC5 unicast link) with the relay terminal using the first credential. The second end terminal may determine whether the previously transmitted security application rules (E2E security profile) and the security functions applied to the IP security protocol (IPSec) match, the second end terminal may complete the IP secure channel setup requested by the first end terminal, or may reject or request a secure channel reset. When the validity time of the end-end credential expires, the second end terminal may re-issue credential through the Uu interface. A plurality of applications running on two end terminals can share the same secondary security channel (IPSec) or use a separate secondary security channel (IPSec). If a terminal that does not have valid credentials intervenes in communication when establishing an IP security channel, the end terminal can recognize this and report it to the mobile communication network.

According to the description with reference to various examples in the disclosure of this specification, when direct communication between terminals is performed through a relay terminal, end-to-end security can be enhanced. In other words, when terminals perform direct communication through relay terminals, security risks may be reduced. For example, end terminals receive information such as an E2E security profile, E2E credential, and E2E credential expiration time from an application server, but relay terminals do not receive such information. Accordingly, security problems such as eavesdropping or alteration by relay terminals can be prevented when end terminals establish a terminal secure channel. That is, man-in-the-middle (MITM) attacks can be prevented. In addition, when an end terminal receives an IP message from another end terminal, since the end terminal determines whether the security function of the IP message conforms to the E2E security profile based on the E2E security profile, security can be enhanced.

For reference, the operation of the terminal (e.g., UE such as UE_R, UE_1, UE_2, a relay terminal, an end terminal, etc.) described in this specification may be implemented by the apparatus of FIGS. 1 to 3 described above. For example, the terminal (e.g., UE) may be the first device 100 or the second device 200 of FIG. 1. For example, an operation of a terminal (e.g., UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE such as UE_R, UE_1, UE_2, a relay terminal, an end terminal, etc.) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of a network node (e.g., AMF, SMF, UPF, PCF, an application server, a ProSe application server etc.) or base station (e.g., NG-RAN, gNB, eNB, RAN, etc.) described herein may be implemented by the apparatus of FIGS. 1 to 3 to be described below. For example, a network node or a base station may be the first device 100*a* of FIG. 1 or the second device 100*b* of FIG. 1. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for performing relay communication, the method performed by a first user equipment (UE) and comprising:
   transmitting a request message including UE ID, Relay information, UE type information, and UE public key information to an application server through a 5th Generation (5G) core network;
   receiving a security related message from the application server as a response to the request message;
   wherein the security related message includes first credential information to be used for establishing a secure link between the first UE and a relay UE, second credential information to be used for establishing a secure link between the first UE and a second UE, and End-to-End (E2E) security profile information related to security settings between the first UE and the second UE;
   establishing a secure link with the relay UE based on the first credential information; and
   receiving an IP message for establishing a secure channel in an IP layer from the second UE.

2. The method of claim 1,
   wherein the E2E security profile information includes information on whether security settings are required for communication between the first UE and the second UE, and information on which security functions are required when security settings are required.

3. The method of claim 1, further comprising:
   determining whether the security function of the IP message matches the E2E security profile information.

4. The method of claim 3, further comprising:
   establishing a security channel with the second UE in the IP layer based on the second credential information, based on that the security function of the IP message matches with the E2E security profile information.

5. The method of claim 3, further comprising:
   transmitting a failure message to the second UE, based on that the security function of the IP message does not match with the E2E security profile information.

6. The method of claim 5, further comprising:
   transmitting a message requesting an update of E2E security profile information to the application server, based on that the failure message is transmitted.

7. The method of claim 6, further comprising:
   receiving updated E2E security profile information from the application server.

8. The method of claim 7, further comprising:
   retrying to establish an IP security channel with the second UE, based on the updated E2E security profile information.

9. The method of claim 1,
   wherein the security-related message further includes E2E credential expiration time information.

10. The method of claim 9, further comprising:
    when a timer based on the E2E credential expiration time information expires, transmitting a message requesting an update of the E2E security profile information to the application server.

11. The method of claim 1,
    wherein the security-related message further includes public key information of the application server, and
    wherein the public key information of the application server is included in the security related message when the E2E credential information is a certificate.

12. A first User Equipment (UE) for performing relay communication, comprising:
    at least one processor; and
    at least one memory that stores instructions and is operably electrically connectable with the at least one processor;
    wherein operation performed based on the instructions being executed by the at least one processor comprises:
    transmitting a request message including UE ID, Relay information, UE type information, and UE public key information to an application server through a 5th Generation (5G) core network;
    receiving a security related message from the application server as a response to the request message;
    wherein the security related message includes first credential information to be used for establishing a secure link between the first UE and a relay UE, second credential information to be used for establishing a secure link between the first UE and a second UE, and End-to-End (E2E) security profile information related to security settings between the first UE and the second UE;
    establishing a secure link with the relay UE based on the first credential information; and
    receiving an IP message for establishing a secure channel in an IP layer from the second UE.

13. The UE of claim 12,
    wherein the first UE is an autonomous driving device that communicates with at least one of a mobile terminal, a network, and an autonomous vehicle other than the first UE.

14. A method for performing communication, the method performed by an application server and comprising:

receiving a request message including User Equipment (UE) ID, relay information, UE type information, and UE public key information from a UE through a 5th Generation (5G) core network;

authenticating whether the UE has authority to operate as an End UE or a relay UE in a UE-to-UE relay service, based on the UE type information and the UE ID; and transmitting a security related message as a response to the request message, based on that the authenticating is completed;

when the UE has authority to operate as the End UE, the security related message includes first credential information to be used for establishing a secure link between the UE and a relay UE, second credential information to be used for establishing a secure link between the UE and other end UE, and End-to-End (E2E) security profile information related to security settings between the UE and the other end UE, and when the UE has authority to operate as the relay UE, wherein the security related message includes third credential information to be used for establishing a secure link between the UE and the first end UE and fourth credential information to be used for establishing a secure link between the UE and the second end UE.

15. The method of claim 14, further comprising:

receiving a message requesting a server to update E2E security profile information from the UE; and transmitting a response message including updated E2E security profile information to the UE.

\* \* \* \* \*